INVENTOR
HORACE E. DARLING
BY
Blair, Curtis & Hayward
ATTORNEYS

April 1, 1952 H. E. DARLING 2,590,946
COMBINING MEASURING CIRCUIT
Filed June 23, 1948 2 SHEETS—SHEET 2

INVENTOR
HORACE E. DARLING
BY
Blair, Curtis & Hayward
ATTORNEYS

Patented Apr. 1, 1952

2,590,946

UNITED STATES PATENT OFFICE 2,590,946

COMBINING MEASURING CIRCUIT

Horace E. Darling, North Attleboro, Mass., assignor to The Foxboro Company, Foxboro, Mass.

Application June 23, 1948, Serial No. 34,715

6 Claims. (Cl. 177—351)

This invention relates to measuring apparatus, and more particularly to apparatus for adding, algebraically, a number of related but separate electrical measuring voltages or currents derived from a plurality of measuring bridge circuits, to obtain an indication of the algebraic sum.

The invention is useful when it is desirable to know the total effect of several related conditions without knowing the values of the individual conditions.

For example, the invention is useful to measure the weight of the contents in a bin or tank which is supported by several legs or columns. This can be accomplished by measuring, separately, the weight carried by each of the supporting members, and then algebraically adding these values to obtain the total weight, correcting, of course, for the weight of the container. The weight carried by each supporting member can be determined by measuring the strain in a particular portion of each supporting member. Such strain measurements can be made electrically by using a wire strain gauge which comprises a length of wire arranged so that the resistance of the wire is a function of the strain of the member to which it is secured; the strain responsive wire forming one of the arms of a Wheatstone bridge. Such resistance type wire strain gauges are in wide use and the principles are well understood.

It has been customary to combine the values of the individual bridge circuits by measuring the unbalance voltage produced between opposite terminals of each bridge and combining such unbalance voltages algebraically to obtain a single reading which is a function of the combined values of all of the conditions. This arrangement is desirable because of the saving in cost and complexity of the equipment, and has particular operational advantages for measuring rapidly changing values.

However, such combining of unbalance voltages has produced several serious difficulties. Thus, when the bridge circuits are connected directly in series, a separate energization source is required for each of the bridge circuits. Moreover, if there are more than two or three bridges, the impedance between ground and the bridges farthest removed electrically from ground, becomes so high that voltages induced in the circuits by stray magnetic and electrostatic fields seriously interfere with the accuracy of the measurement. When the bridge circuits are connected in parallel and are energized from a common alternating current source, and have their output terminals connected to separate primary windings of a conventional type transformer with a single core, and the voltage induced in the secondary winding of the transformer is used to measure the combined voltage unbalance, then the mutual interaction between the separate bridge circuits introduces errors that interfere with accurate measurements.

So also if separate transformers are used with their primary windings connected, respectively, to the output terminals of the bridge circuits and their secondary circuits connected in series, cross coupling and pick-up effects interfere with the accuracy of the system.

Accordingly, it is an object of this invention to provide a system by which several independent measuring bridge circuits can be energized from a single power source and the unbalance voltages of the bridges combined algebraically without interaction between the several bridge circuits.

Other objects and advantages of the invention will be more fully understood by considering the following description of a measuring system embodying the invention.

The voltage balancing and indicating device utilized in this embodiment may be of the general type set forth in detail in the co-pending U. S. patent application of Howe and Cushman, Serial No. 496,438, filed July 28, 1943, to which reference may be made for further delineation of principles and structural details of certain measurements and components referred to in the following description, or indicated in the accompanying drawings, in which.

Figure 1:
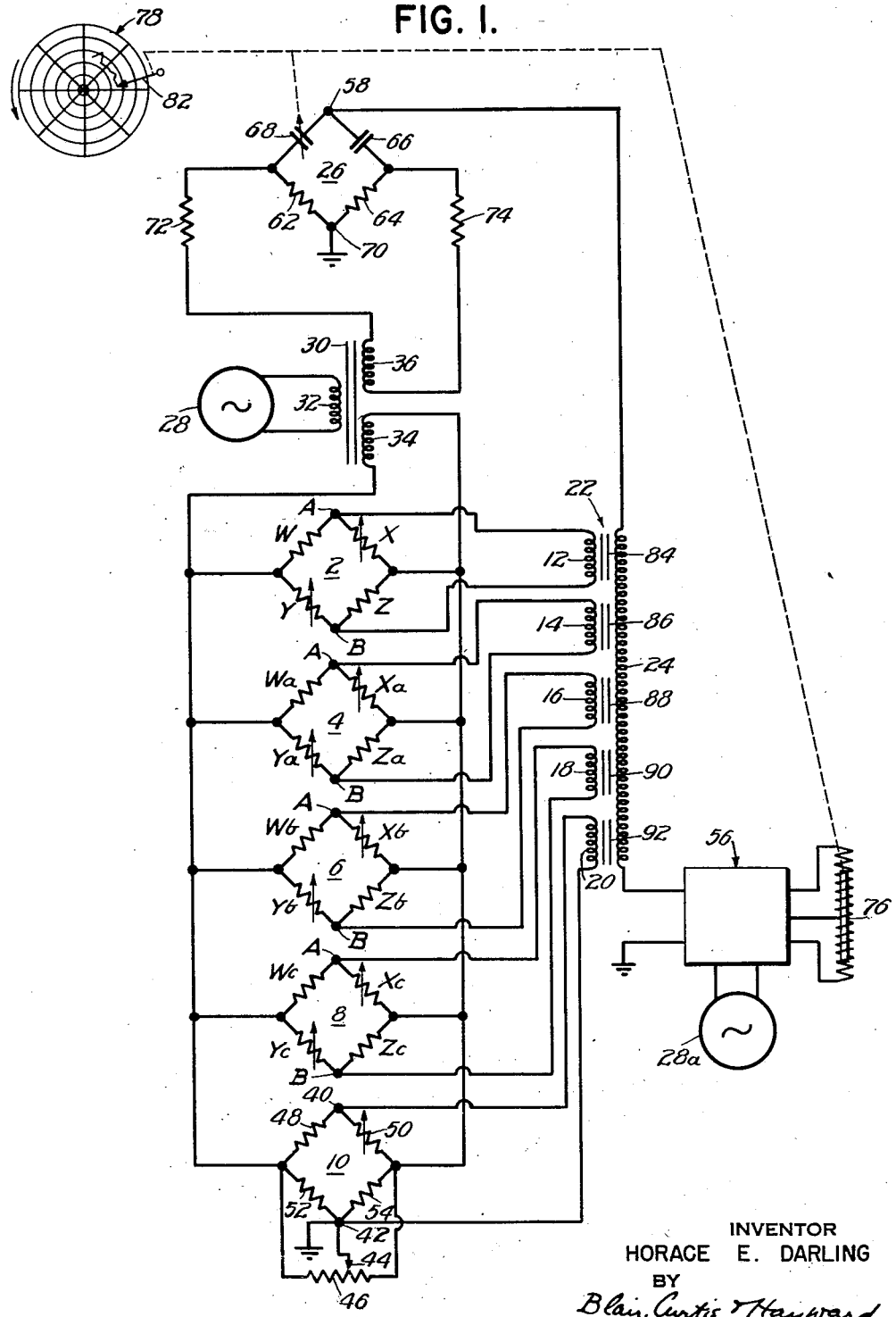
Fig. 1 shows, diagrammatically, a circuit arrangement embodying the present invention for measuring the total unbalance voltage of four element or measuring bridges incorporating condition sensitive elements.

I have found that the outputs of several separate measuring bridge circuits may be combined without interaction by an arrangement such as shown in Fig. 1, in which the unbalance voltage of five Wheatstone bridges 2, 4, 6, 8 and 10 are coupled, respectively, to primary windings 12, 14, 16, 18 and 20, of a multi-core transformer, generally indicated at 22. Bridges 2, 4, 6 and 8 may be considered as condition sensitive bridges used to measure the strain in four legs supporting a tank (not shown) which is to be weighed. The unbalance voltages of the bridges are combined in a common secondary winding 24, and are opposed by an equal voltage of opposite phase developed by a balancing bridge 26. With this arrangement, the adjustment of bridge 26 required to produce this condition of balance is a measure of the total effect of the conditions being measured; i. e. the total weight supported by the four legs.

The bridge 10 is a zero-setting and compensating bridge for zeroing the four measuring bridges 2, 4, 6 and 8 which produce unbalanced voltages which are functions of the conditions being measured. Bridge 2, for example, comprises four arms W, X, Y and Z; the arms W and Z being fixed or compensating elements, and arms X and Y representing the resistances of wire type bonded strain gauges. The other element bridges 4, 6 and 8 are constructed similarly with the elements $Xa$, $Ya$, $Xb$, $Yb$, and $Xc$, $Yc$, representing strain sensitive elements similar to elements X and Y.

In order to provide operating power for the measuring and zeroing bridges, an oscillator 28, which generates an alternating voltage of suitable frequency and magnitude, is coupled by a transformer to the bridges. To this end, the oscillator is connected to primary winding 32 of the transformer 30, and the bridges are connected in parallel across the secondary winding 34 of this transformer.

If the individual bridges are balanced, no voltage will exist between the respective output terminals A and B of the measuring bridges; but any change in the resistance of the strain sensitive elements X, Y, $Xa$, $Ya$, $Xb$, $Yb$, $Xc$ or $Yc$ will unbalance the respective bridges and produce unbalance voltages between the corresponding output terminals A and B, and the value of the unbalance voltages will be a function of the strain imparted to the strain sensitive elements.

The zeroing bridge circuit 10 provides a zero-setting adjustment by which the strains of elements X, Y, $Xa$, $Ya$, $Xb$, $Yb$, $Xc$ and $Yc$, and the corresponding unbalance voltages across terminals A and B may be counteracted exactly to bring the indicating mechanism, to be described, to read zero, or any other desired value. Such an arrangement is convenient in order to cancel out the weight of the tank itself, when it is desired to measure only the weight of the contents of the tank.

Zeroing of circuit 10 is accomplished by adjusting, in known manner, the resistance elements 48, 50, 52 and 54 of bridge 10.

In addition, bridge 10 is arranged to compensate for (render ineffective) spurious induced voltages. To this end, a potentiometer 46 is connected across secondary winding 34, and an adjustable tap 44, variable along potentiometer 46, is connected to terminal 42 and to ground. By adjustment of tap 44, the relative ground potential with respect to the element bridges and the zeroing bridge is adjustable so that constant stray fields will not interfere with the accuracy of the measuring system.

I have discovered that the unbalance voltages of the element and zeroing bridges may be combined algebraically, without having the unbalance of one bridge affect the unbalance of another, by coupling the output terminals A and B of each element bridge, and terminals 40 and 42 of zeroing bridge 10, with respective primary windings 12, 14, 16, 18 and 20 of a multi-core transformer 22, if such transformer is used as a voltage collector device and not as a voltage or power transforming device.

Thus, the multi-core transformer 22 is specially constructed to operate as a voltage collection device and the circuit in which it is incorporated is designed to draw so little power from transformer 22 that it operates as a voltage collection device and not as a power transformer.

To this end, the voltage in the secondary winding 24 of transformer 22 is measured without permitting flow of current therein such as would cause interaction between the primary windings 12, 14, 16, 18 and 20. This may be accomplished by connecting the secondary winding 24 in series with a high impedance circuit; for example, the grid circuit of an electronic amplifier which may be incorporated in arrangements of the type set forth in the above-mentioned patent application, or other suitable measuring circuits meeting the requirements set forth herein.

In the arrangement shown in Fig. 1, one end of winding 24 is connected to the high impedance input circuit of an amplifier forming part of a null detecting device generally indicated in box 56. The opposite end of winding 24 is connected to output terminal 58 of the balancing bridge 26, which may be adjusted to just balance and offset the voltage induced in winding 24.

The balancing bridge 26 is in effect the bridge that measures the algebraically added unbalance voltages. It comprises two resistance arms 62 and 64, and two capacitance arms 66 and 68; the capacity 68 being variable to permit balancing the bridge. This bridge circuit is suitably energized by a voltage preferably derived from the same oscillator 28, so that correct frequency and phase relationships may be obtained, for example, from the separate transformer winding 36; input terminals of the bridge 26 being connected through current-limiting resistors 72 and 74 to the output of transformer 30.

The output voltage of the bridge is developed between the terminal 58 and an opposing grounded terminal 70.

With this arrangement, the difference in the voltage developed by the bridge 26 and that induced by the primary windings 12, 14, 16, 18 and 20, in the secondary winding 24, is developed across the input terminals of the amplifier arrangement 56. This unbalance voltage is amplified and utilized to drive a conventional motor 76 which, in turn, is connected mechanically (by suitable means not shown) to adjust the position of the capacitor 68 to reduce to zero any voltage difference existing between the input terminals of amplifier 56. In order to determine the relative polarity of the secondary voltage across the input terminals of amplifier 56, a comparison voltage, having the same phase and frequency as the voltage delivered by the source 28, is applied to the amplifier 56 from a source $28a$, which may comprise still another secondary winding on transformer 30.

The system is arranged so that capacitor 68 is adjusted automatically in the direction that will reduce the differential input voltage to amplifier 56. When this voltage has been reduced to zero, within the limits of accuracy of the particular system, no further movement of the capacitor 68 will occur so long as no change occurs in the conditions being measured.

As will be apparent to those familiar with Wheatstone bridges, the instantaneous polarity or phase of the unbalance voltage of bridges such as 2, 4, 6, 8, 10 and 26, relative to their source of energization, will depend upon whether the values of their sensitive elements have increased or decreased from the values at which the bridges balance. Accordingly, if one of the element bridges has become unbalanced in a direction opposite to that in which the remaining bridges are unbalanced, the resulting voltage opposition in secondary winding 24 will produce a subtractive effect. Thus, the net voltage developed in winding 24 will have a polarity or phase, depending upon the algebraic sum of the magnitudes and directions in which the several bridges 2, 4, 6 and 8 have become unbalanced.

So also bridge 26 automatically balances, by movement of motor 76 and capacitor 68 in the correct direction and amount to balance any change in voltage in winding 24 caused by change in elements X, Xa, Xb or Xc.

If a continuous record of the measured value is desired, a chart, generally indicated at 78, and a recording pen 82, driven in synchronism with capacitor 68, may be added to the system.

Figure 2:
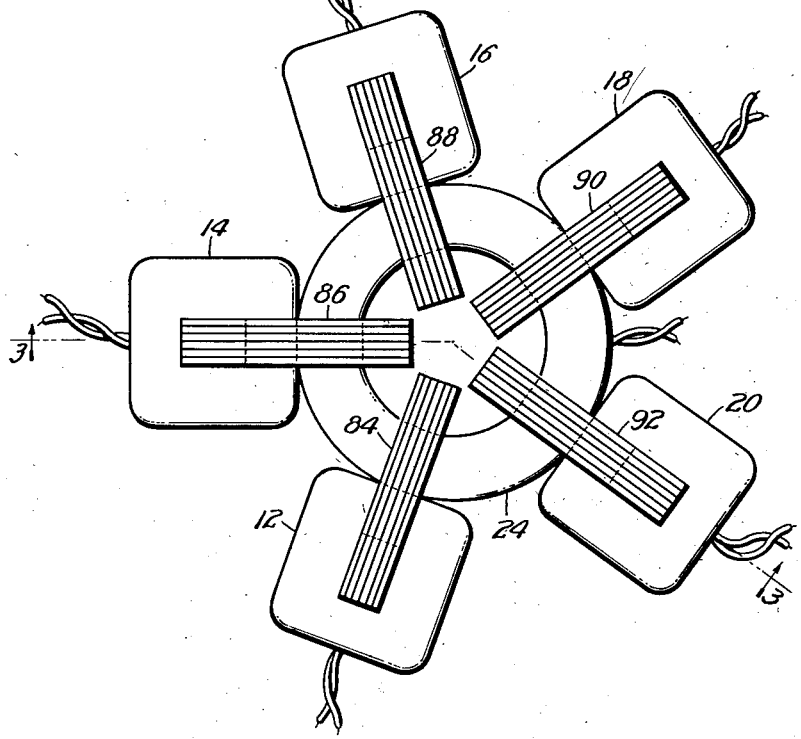
Fig. 2 is a plan view of a transformer useful in the circuit shown in Fig. 1.
Figure 3:
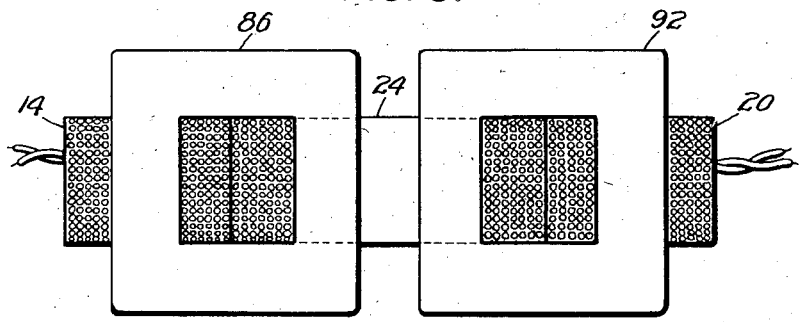
Fig. 3 is a sectional view of the transformer, taken on line 3—3 of Fig. 2.

In order to couple the separate primary windings 12, 14, 16, 18 and 20 (Figs. 1 and 2) to the common secondary 24, without permitting the unbalance voltage of one bridge to induce spurious voltages in the other bridge circuits, each of the primary windings is coupled to a separate magnetic circuit. As shown in Fig. 2, iron cores 84, 86, 88, 90 and 92 are provided for the primary windings 12, 14, 16, 18 and 20, respectively. Secondary winding 24 is wound so that each turn of the winding passes through each of the iron cores. With this arrangement, undesirable direct magnetic coupling between the individual primary windings is reduced to a minimum, but each of the primary windings is coupled closely to the secondary winding 24. In order to prevent coupling between the primaries by stray flux, the iron cores are physically separated to a point where leakage flux from neighboring cores produces a negligible effect.

I have found also that the amount of undesired coupling between the primaries by flux generated by secondary winding 24 can be avoided, by limiting the flow of current through the secondary winding.

Thus, the individual element bridge circuits, although energized from a common source, and closely coupled to a common output circuit, are isolated effectively from each other; and the unbalance voltage of each bridge has its own effect, whether added or subtracted, on the resultant indicated value, independent of the condition of balance of the remaining bridges. Moreover, the entire system is accurate, stable and is simple in construction, and may be applied readily to a wide variety of measuring devices.

I claim:

1. In a measuring apparatus for combining algebraically a plurality of measuring voltages, in combination, a collection transformer having a plurality of separate magnetic circuits, a plurality of separate primary windings each coupled to one of said magnetic circuits, and a common secondary winding coupled to each of said magnetic circuits, a plurality of electrical bridge networks each containing a condition sensitive element, each of said bridge networks being coupled to one of said primary windings, a high impedance measuring device connected to said secondary winding and responsive to the voltage output of said secondary winding, and a capacity balance bridge under control of said measuring device for generating a null-producing voltage opposing said voltage output of said secondary winding, whereby the unbalance adjustment of said capacity balance bridge is a measure of the algebraic sum of the magnitude and direction of the unbalance voltages of said bridge networks.

2. In a measuring apparatus for combining algebraically a plurality of measuring voltages, in combination, a collection transformer having a plurality of separate magnetic circuits, a plurality of separate primary windings each coupled to one of said magnetic circuits, and a common secondary winding coupled to each of said magnetic circuits, a plurality of electrical bridge networks each containing a condition sensitive element, each of said bridge networks being coupled to a separate one of said primary windings, and a high impedance measuring device connected to said secondary winding and responsive to the voltage output of said secondary winding, whereby said measuring device is responsive to the algebraic sum of the magnitude and direction of the unbalance voltages of said bridge networks.

3. In a measuring apparatus for determining the combined effect of a plurality of conditions, in combination, a collection transformer having a plurality of isolated magnetic circuits, a plurality of separate primary windings each coupled to one of said magnetic circuits, and a common secondary winding having all of its turns coupled to each of said magnetic circuits, means for producing a plurality of alternating current signals, the magnitudes of which are functions of the values of said conditions, a plurality of separate electrical networks coupling each of said alternating current signals to one of said primary windings, and a measuring device having a high impedance input circuit connected to said secondary winding and responsive to the voltage output of said secondary winding, whereby said measuring device is responsive to the algebraic sum of the magnitude and direction of said alternating current signals.

4. In a measuring apparatus for combining voltages derived from a plurality of separate condition sensitive elements, in combination, a collection transformer having a plurality of isolated magnetic circuits, a plurality of separate primary windings each coupled to one of said magnetic circuits, and a secondary winding having a plurality of turns, each turn being coupled to each of said magnetic circuits, a plurality of condition sensitive voltage-producing means, a plurality of separate electrical networks each coupling one of said condition sensitive elements to one of said primary windings, and a high impedance measuring device connected to said secondary winding and responsive to the voltage output of said secondary winding, whereby said measuring device is responsive to the algebraic sum of the magnitude and direction of the alternating current signals produced by said sensitive elements.

5. In a measuring apparatus for combining algebraically external bridge signals, in combination, a transformer having a plurality of isolated magnetic circuits, at least three separate primary windings each coupled to one of said magnetic circuits, and a secondary winding having a plurality of turns, each turn being coupled to each of said magnetic circuits, at least three bridge measuring circuits, a source of alternating voltage for energizing each of said bridges in common phase relationship, a plurality of networks coupling the unbalance voltages of said bridge circuits to said primary windings, and a high impedance measuring device connected to said secondary winding for measuring the algebraic sum of the unbalance voltages.

6. Electrical measuring apparatus as described in claim 5 in which certain of said bridge circuits contain condition sensitive elements, and another of said bridges is adapted to deliver an adjustable voltage for establishing a condition of comparison.

HORACE E. DARLING.

REFERENCES CITED

The following references are of record in the file of this patent:

UNITED STATES PATENTS

| Number | Name | Date |
| --- | --- | --- |
| 1,611,224 | Nyquist | Dec. 21, 1926 |
| 1,614,217 | Thompson | Jan. 11, 1927 |
| 1,986,986 | Swartwout | Jan. 8, 1935 |
| 2,450,263 | Wise | Sept. 28, 1948 |
| 2,454,807 | Kennedy | Nov. 30, 1948 |
| 2,434,438 | Ruge | Jan. 13, 1948 |
| 2,470,069 | Davies | May 10, 1949 |